No. 660,532. Patented Oct. 23, 1900.
J. D. McRAE.
JOURNAL BEARING.
(Application filed May 7, 1900.)

(No Model.)

WITNESSES:

INVENTOR
John D. McRae
BY
Smith & Denison
ATTORNEYS.

UNITED STATES PATENT OFFICE.

JOHN D. McRAE, OF OSWEGO, NEW YORK, ASSIGNOR TO THOMSON KINGSFORD, OF SAME PLACE.

JOURNAL-BEARING.

SPECIFICATION forming part of Letters Patent No. 660,532, dated October 23, 1900.

Application filed May 7, 1900. Serial No. 15,669. (No model.)

*To all whom it may concern:*

Be it known that I, JOHN D. McRAE, of Oswego, in the county of Oswego, in the State of New York, have invented a new and useful Journal-Bearing, of which the following, taken in connection with the accompanying drawings, is a full, clear, and exact description.

This invention relates to bearings, and has more particular reference to water-bearings for centrifugal pumps.

I have found in the operation of centrifugal pumps that sand, dirt, and other foreign substances are forced into the bearing of the shaft upon which the rotating head is mounted. This is due to the great pressure within the pump, so much so that in a comparatively short time the bearing is cut out or worn to such an extent that it is necessary to replace it.

My object, therefore, is to overcome this objection and provide a bearing which shall preclude the sand or dirt from coming in contact with the bearing or bushing by causing the sand to be continuously forced back into the pump; and to that end my invention consists in the several new and novel features of construction and operation which are hereinafter described, and specifically set forth in the claim hereunto annexed.

In view of the fact that my invention relates only to the bearing of the shaft upon which the rotating head is mounted I only show a portion of a centrifugal pump and the journal-bearing and journal mounted therein. It is constructed as follows, reference being had to the accompanying drawings, in which—

Figure 1:
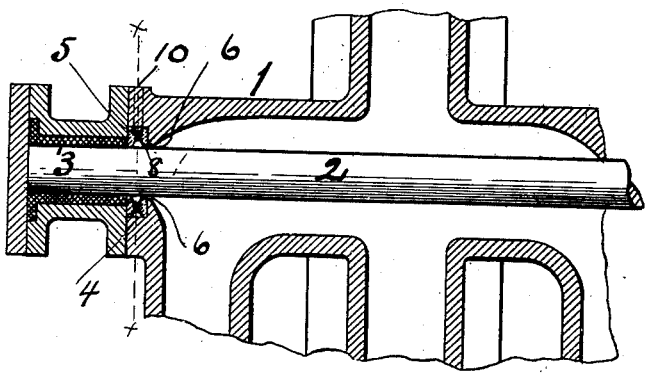
Figure 2:
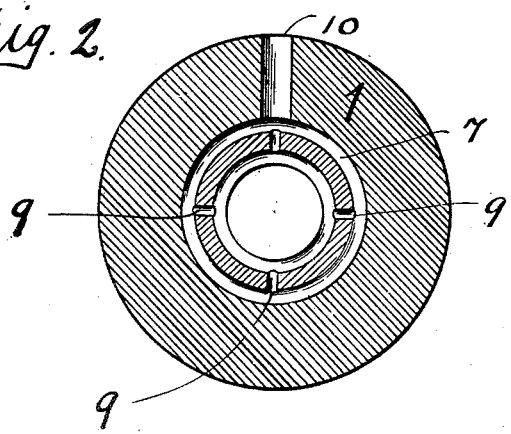
Figure 3:
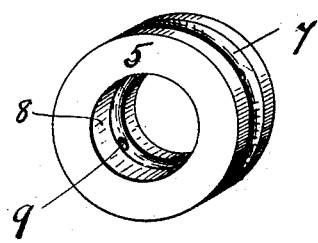

Figure 1 is a cross-section of a part of a centrifugal pump, showing the journal-bearing in section and the journal or shaft mounted therein. Fig. 2 is a cross-section on line X X in Fig. 1. Fig. 3 is an isometrical view of the composite ring detached.

Similar numerals of reference indicate corresponding parts.

1 is the shell or outer casing of a pump, having a journal or shaft 2 mounted transversely therein, substantially as shown, except that the drawings show but one bearing, that being deemed sufficient to illustrate my invention. The shaft 2 rides in the bushing 3 in the ordinary way. In the casing 1 is an annular channel 4, in which is mounted a composite ring 5, and that portion of the casing is cut away which surrounds the bearing, as shown at 6, so as to form an annular chamber around the bearing somewhat larger than the journal, and connects the chamber 4 with the interior of the pump for the purposes hereinafter set forth. The composite ring has an annular groove 7 in its periphery, and its inner edge 8 of the inner face is cut away, as shown in Figs. 1 and 3, for forming a passage communicating with the chamber or cut-out 6.

9 shows openings in the ring 5 from the annular groove 7, extending radially and connecting said groove with the removed portion 8 upon the inner face of the composite ring.

10 is an opening in the shell 1 of the pump, communicating with the annular groove 7, and its capacity is about equal to the capacity of the combined openings 9 in the composite ring.

As the shaft 2 rotates and the sand works its way along into the chamber 6 it is forced back by a clean stream of water or by any means convenient, (not shown,) being forced into the opening or conduit 10, where it passes into the annular groove 7, thence through the openings 9 out into the chamber 6, and thence into the body of the pump. It will thus be observed that by continuously forcing this water, as above specified, all of the sand, grit, dirt, and other foreign substances and material will be continuously washed away and be kept from the bushing and bearing proper.

Having thus fully described my invention, what I claim as new, and desire to secure by Letters Patent, is—

The combination with the shell of a centrifugal pump having a journal-opening and a branch inlet-opening leading from the journal-opening to the exterior of the shell, of a ring having a shaft-opening and inner and outer annular grooves connected to each other and to the inlet-opening, said shaft-opening of the ring having a cut-away portion extending from the inner annular groove to one of the end faces of the ring, substantially as set forth.

In witness whereof I have hereunto set my hand this 2d day of May, 1900.

JOHN D. McRAE.

Witnesses:
W. V. BURR,
F. M. JOHNSON, Jr.